United States Patent [19]

Tsunoda et al.

[11] Patent Number: 4,734,155

[45] Date of Patent: Mar. 29, 1988

[54] METHOD AND DEVICE FOR MANUFACTURING A LAMINATED MATERIAL

[75] Inventors: Kazuyoshi Tsunoda; Kenji Tonoki; Haruki Yokono; Hisao Kono, all of Yuki; Ryoji Yokoyama, Musashino; Kazuo Kobayashi, Shimodate, all of Japan

[73] Assignee: Hitachi Chemical Co., Ltd., Japan

[21] Appl. No.: 37,850

[22] Filed: Apr. 13, 1987

Related U.S. Application Data

[63] Continuation of Ser. No. 692,565, Jan. 18, 1985, abandoned.

[30] Foreign Application Priority Data

Jan. 19, 1984 [JP] Japan ................................ 59-8290

[51] Int. Cl.$^4$ ............................................. B30B 15/32
[52] U.S. Cl. ................................ 156/583.1; 100/211; 100/295; 156/323
[58] Field of Search .................. 156/583.1, 323, 285; 100/211, 295, 93 P; 425/406

[56] References Cited

U.S. PATENT DOCUMENTS

| | | | |
|---|---|---|---|
| 2,627,628 | 2/1953 | Dare | 100/93 P |
| 2,646,105 | 7/1953 | Langer | 100/93 P |
| 3,255,476 | 6/1966 | Dawson | 100/211 X |
| 3,434,910 | 3/1969 | Kannegeisser | 100/211 X |
| 3,619,310 | 11/1971 | Clarke | 100/295 X |
| 4,053,276 | 10/1977 | Ahrweiler et al. | 100/295 X |
| 4,156,589 | 5/1979 | Schmitt | 100/211 X |
| 4,576,092 | 3/1986 | Yamato | 100/295 X |

*Primary Examiner*—David Simmons
*Attorney, Agent, or Firm*—Antonelli, Terry & Wands

[57] ABSTRACT

A method for manufacturing a laminated plate material by compression forming, in which material for lamination is sandwiched between two pressure plates, and a layer of fluid pressure medium is sandwiched between said material for lamination and one of said pressure plates and is pressurized so as to pressurize said material for lamination. Thereby, the pressure is well distributed over the superficies of the material for lamination, thus ensuring a good and uniform product. A device is also disclosed for performing the method.

3 Claims, 8 Drawing Figures

METHOD AND DEVICE FOR MANUFACTURING A LAMINATED MATERIAL

This application is a continuation application of application Ser. No. 692,565, filed Jan. 18, 1985, now abandoned.

BACKGROUND OF THE INVENTION

The present invention relates to a method and a device for manufacturing laminated plate material, such as are widely used as electrical insulation material and so forth, and in particular relates to such a method and device for producing laminated plate material, in which the pressure applied to the laminate is made to be more constant and uniform over the whole area of the laminated plate material.

Conventionally, laminated plate materials such as synthetic resin laminates are manufactured by: (1) impregnating a base material such as paper or glass cloth with phenol resin, epoxy resin, polyimide resin, or the like; (2) drying this material to form the so called "prepreg" material (this abbreviation, which will be used henceforward in this specification, stands for "pre-impregnated material"); (3) stacking up a number of prepregs into a stack of the required thickness for the final laminated plate material, including if required one or two outer surface layers of copper foil or the like on one or both of the outer surfaces of the stack to be laminated together with it; (4) placing this stack assembly in between two mirror plates made of for example stainless steel of thickness 1 to 3 mm, so as to form a completed sandwich assembly; (5) inserting the resulting sandwich assembly in between two end plates of a multi opening press machine for laminating; (6) squeezing the two end plates together so as to pressurize the sandwich assembly; and (7) heating up the sandwich assembly and maintaining the heat and pressure conditions on the compressed and heated stack for a certain appropriate time period. One or more cushion plates are often interposed between one of the end plates, or both of them, and the sandwich assembly, in order to provide an even pressure distribution over the entire surface of the laminated material, and in order to ensure an even temperature distribution. Further, in order to make best utilization of the large and expensive mechanism of the press, it is usual to in fact insert a large number of such sandwich assemblies in between the two end plates of the press, further including other intermediate plates and cushion plates in the superposed stack; and the pressure exerted by the press is transmitted through the entire stack. In this case, it is usual that the intermediate plates are formed as hot plates each incorporating heating means therein.

This type of prior art laminating process is shown in schematic sectional view in FIGS. 1 and 2 of the accompanying drawings. FIG. 1 shows a section through a stack consisting of a number of sandwiches of prepregs 1 and mirror plates 2, which is being supported on a carrier plate 4 with a cushion plate 3 interposed between the carrier plate 4 and the proximate mirror plate 2 in order to make for a more even pressure distribution. Further, FIG. 2 shows a side view partly in section of a press 8 charged with a number of such stacks as shown in FIG. 1 as carried on the carrier plate 4: in this figure, the press 20 comprises a base 8 which is formed with a cylinder in which a piston member 9 slides, and the cylinder chamber 10 defined under the piston 9 in the figure selectively either is supplied with pressurized hydraulic fluid from a hydraulic fluid reservoir 11 by a pump 13 or is exhausted of hydraulic fluid through a valve 12 to said reservoir 11. Thereby the piston 9 is selectively either forced in the upwards direction in the figure or is lowered therein. Further, on the top of the piston 9 there is fixed a lower end plate 7, which can slide upwards and downwards, as the piston 9 is raised or lowered, along slide guide members 6, 6 which are fixedly mounted on the base 8. To the top of the slide guide members 6, 6 there is fixedly mounted an upper end plate 5, and accordingly when the piston 9 is raised by supply of hydraulic fluid to the chamber 10 by the pump 13 then the upper and lower end plates 5 and 7 are brought towards one another with a very high pressing force, while on the other hand when the piston 9 is lowered by draining of hydraulic fluid from the chamber 10 through the valve 12 then the upper and lower end plates 5 and 7 are brought apart from one another. And between the upper and lower end plates 5 and 7 there are placed a number of stacks like the stack of FIG. 1, each consisting of a number of prepregs 1 and mirror plates 2 stacked together and supported on the lower end plate 7 and the intermediate plates 14 with a cushion plate 3 interposed between the supporting plate member 4 and the proximate mirror plate 2. The intermediate plates 14, which are generally formed as hot plates as described above, are slidingly mounted on the slide guide members 6, 6. The slide guide members 6, 6' are provided, through this is not shown in the figure, with stop means spaced therealong which are adapted to hold the intermediate plates 14 from sliding down beyond certain predetermined level positions, so that the intermediate plates 14 are held as spaced from each other when the lower end plate is lowered to its lowermost position for the convenience of loading and unloading of the stacks of prepregs into and out of the spaces defined between the upper and lower end plates 5, 7 and the intermediate plates 14.

In operation, each stack of prepregs 1 sandwiched between the mirror plates 2 is carried on the carrier plate 4 as shown in FIG. 1, is charged into each space defined between the upper and lower end plate 5, 7 and the intermediate plates 14, and is placed on the lower end plate 7 or on one of the intermediate plates 14, with the carrier plate 4 being removed thereafter. Then fluid pressure is supplied to the cylinder chamber 10 to drive the piston 9 upwards to pressurize the whole set of stacks of prepregs together, with interposition of the intermediate plates 14.

However, this prior art type method for manufacture of a laminated material, and device for performing such manufacture, are prone to the following problems.

First, because the cushion plate 3, which is provided in order to ensure even temperature and more particularly pressure during the lamination, is typically made of paper or rubber or the like, it suffers fatigue because of heat and pressure degradation and because of scuffing from the edges of the mirror plates 2, and its life is limited to at most 500 cycles.

Further, especially later in the life of such a cushion plate 3, its thickness may become uneven, and this can lead to unevennesses in the pressure distribution over the materials which are being laminated, thus possibly leading to defects in the finished laminated material. In any case, even when the cushion plate 3 is relatively new, its function for distributing the pressure applied to the sheets to be laminated uniformly over their entire surface area is not completely effective, and poor pressure distribution inevitably occurs.

Also, because the cushion plates 3 are used, the thermal transmission between the hot plate type intermediate plates 14 and the material to be laminated is reduced, and this means that the speed of the laminating process is low.

Finally, a particularly troublesome problem relates to the distribution of the pressure applied by the squeezing together of the top and bottom end plates 5 and 7. Since inevitably some friction arises between the intermediate plates 14 and the slide guide members 6, 6 (and this friction can become quite severe in the case of some skewing of the stack, even slight skewing), and since moreover sticking between one of the intermediate plates 14 and one of the slide guide members 6 can arise, there is a danger that one of the stacks of prepregs 1 and mirror plates 2 may be compressed more than another. This can further lower the quality and uniformity of the finished laminate produced as described above.

SUMMARY OF THE INVENTION

Accordingly, it is the primary object of the present invention to provide a method for producing a laminated material, and a device for practicing said method, which avoid the above outlined problems.

It is a further object of the present invention to provide such a method for producing a laminated material, and a device for practicing said method, which ensure good pressure distribution over the surface of the materials to be laminated together.

It is a further object of the present invention to provide such a method for producing a laminated material, and a device for practicing said method, which ensure constancy of pressurization applied to materials to be laminated together, as stacked up and applied with pressure at the same time.

It is a further object of the present invention to provide such a method for producing a laminated material, and a device for practicing said method, which avoid the above outlined problems relating to deterioration of a cushion plate for pressure distribution.

It is a further object of the present invention to provide such a method for producing a laminated material, and a device for practicing said method, which ensure uniform heating over the entire surface of the materials to be laminated together.

It is a yet further object of the present invention to provide such a method for producing a laminated material, and a device for practicing said method, which can consistently produce laminated material of good uniformity.

It is a yet further object of the present invention to provide such a method for producing a laminated material, and a device for practicing said method, which can consistently produce laminated material of high quality.

It is a yet further object of the present invention to provide such a method for producing a laminated material, and a device for practicing said method, which allow many sheets of laminated material to be reliably and quickly and easily made with one operation of lamination, thus keeping costs low.

According to the most general method aspect of the present invention, these and other objects are accomplished by a method for manufacturing a laminated plate material by compression forming, in which a plate material for lamination is sandwiched between two pressure plates, and a layer of fluid pressure medium is sandwiched between said plate material for lamination and one of said pressure plates and is pressurized so as to pressurize said plate material for lamination; and, according to the most general device aspect of the present invention, these and other objects are accomplished by a device for manufacturing a laminated material by compression forming, comprising two pressure plates for sandwiching a plate for lamination between them, a chamber for receiving a layer of fluid pressure medium as sandwiched between said plate material for lamination and one of said pressure plates, and a means for pressurizing said fluid pressure medium in said chamber so as to pressurize said material for lamination; while, according to another device aspect of the present invention, these and other objects are accomplished by a device for manufacturing a laminated material, comprising a plurality of pressure plates for sandwiching a plurality of stacked plate materials for lamination each between two adjacent ones of said pressure plates, a plurality of chambers each for receiving a layer of fluid pressure medium as sandwiched between each of said stacked materials for lamination and an adjacent one of said pressure plates, and a means for pressurizing said layers of fluid pressure medium in said chambers so as to pressurize said stacked materials for lamination.

According to such concepts, good pressure distribution is ensured over the entire surface of the materials to be laminated together, by the flowing action of the pressure medium. Further, according to the particular aspect of the present invention proximately described, high constancy in pressure application is ensured through all the layers of the plate materials to be laminated together, in the direction along the direction of application of pressure, by the fact that the pressurization is applied, not from the ends of the stacked plurality of the stacked plate materials for lamination, but all through and along said stacked plurality of the stacked plate materials for lamination by the concurrent pressurization of all said chambers. Further, because no cushion plate for pressure distribution such as in the prior art is required, the above outlined problems relating to deterioration of such a cushion plate, such as due to heat and pressure degradation and scuffing, do not occur. Equally, because the resistance to heat flow of such a cushion plate is not present, and because the pressure medium is fluid, good temperature distribution over the surface of the materials to be laminated together is assured. Thus, there is provided a method for producing a laminated plate material, and a device for practicing said method, which can consistently produce laminated plate material of good uniformity and high quality. Further, the version of the device of the present invention proximately described provides a method for producing a laminated plate material, and a device for practicing said method, which allow many sheets of laminated plate material to be reliably and quickly and easily made with one operation of lamination, thus keeping costs low.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

Figure 8:
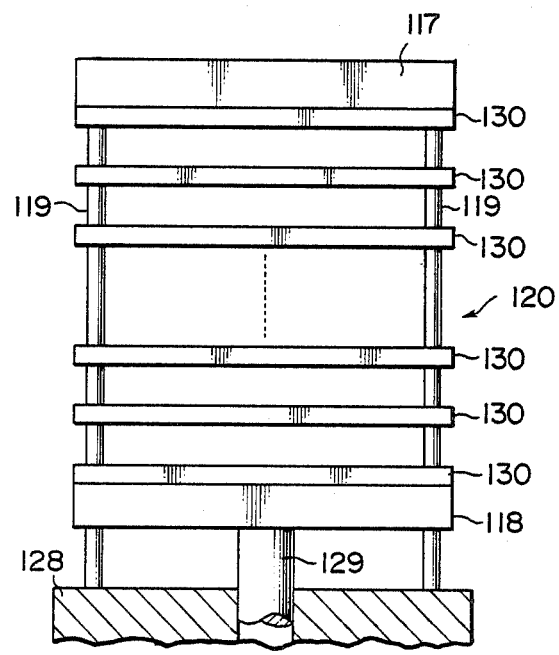
FIG. 8 is a sectional view, similar to FIG. 2, showing a laminate forming press according to a preferred embodiment of the present invention.

The present invention will now be described with reference to the preferred embodiments thereof, and with reference to the appended drawings. FIG. 8 is a schematic view, similar to FIG. 2 relating to the prior art, showing a multi opening press machine for lamination 120 according to the preferred embodiment of one aspect of the device side of the present invention. The base portion 128 of this press, including a piston 129 and so on, is similar to the prior art type of press shown in FIG. 2 and described above with regard to its mechanical structure, except that the power system for driving the lower end plate 118 may be of a much smaller output; and hence the description thereof will not be repeated, in the interests of brevity of description. The piston 129 drives a lower end plate 118, which can slide upwards and downwards, as the piston 129 is raised or lowered, along slide guide members 119, 119 which are fixedly mounted on the base 128 of the press. To the top of the slide guide members 119, 119 there is fixedly mounted an upper end plate 117, and accordingly when the piston 129 is raised then the upper and lower pressure plates 117 and 118 are brought towards one another, while on the other hand when the piston 129 is lowered then the upper and lower pressure plates 117 and 118 are brought apart from one another. And between the upper and lower end plates 117 and 118 there are placed a number of supporting and pressing plate assemblies 130, each being adapted to support a stack of prepregs and mirror plates thereon, but without any cushion plate interposed between itself and the proximate mirror plate; however, these stacks are not shown in FIG. 8, in the interests of simplicity of the drawing. These supporting and pressing plate assemblies 130 are slidingly mounted on the slide guide members 119, 119, and, in the same manner as described with respect to the intermediate plates 14 in the prior art press shown in FIG. 2, they are supported by stop means arranged along the slide guide members 119, 119 as spaced therealong in the vertical direction, so as to provide spaces of a proper height for loading the stacked materials for lamination into the spaces and unloading the laminated products out from the spaces.

Figure 3:
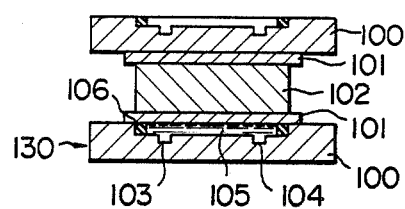
FIG. 3 is a sectional view of a single supporting and pressing plate assembly incorporated in a multi opening press machine for lamination according to a preferred embodiment of the present invention shown in FIG. 8, said assembly itself being a first preferred embodiment of one aspect of the present invention, particularly showing a pressure fluid chamber defined by said assembly and a mirror plate.

In FIG. 3, there is shown a first preferred embodiment for one of the supporting and pressing plate assemblies 130, which itself is one aspect of the device side of the present invention; and part of the next such assembly 130 in the upwards direction is also shown, as well as a stack 102 of laminate material sandwiched between two mirror plates 101 all held between these assemblies 130. The base plate 100 of this supporting and pressing plate assembly 130 is in fact in this particular construction also a hot plate (i.e. is provided with a heater element—but this is not to be considered as limitative of the present invention), because heating of the stacked prepregs may be applied by any other means such as hot air flowing, hot beam radiation, etc.—and its upper side is formed with a depression over its central portion, with a lip portion being left therearound to surround this depression. The depth of this depression, i.e. the height of the lip, should be at least 0.5 mm; a preferred value is between 0.5 mm and 1.0 mm; and the size of the depression, i.e. its lateral extent, should be slightly smaller than the size of the final compressed laminate sheet product which is intended to be produced. Typically, the depression is 2 to 20 mm smaller than the laminate sheet, and more preferably said depression is 3 to 5 mm smaller than said laminate sheet. Rollers or runners, not shown, may be provided for feeding laminate materials and so on into and out of the supporting and pressing plate assemblies 130.

The central portion of this depression in the base plate 100 is provided with a supply port 103 and a drain port 104, for respective supply and drain of pressure fluid medium as will be explained shortly, and a seal member 106 is provided running all around the outer edge of the depression, in its free and uncompressed state rising to above the level of the upper surface of the periphery of said base plate 100. This seal member may be made of a per se known material such as Teflon or the like, and should be heat resistant and resistant to the type of pressure fluid to be used as described later—for instance, should be oil resistant. Thus, when the stack 102 of laminate material sandwiched between the two mirror plates 101 is all held between these assemblies 130 as shown in FIG. 3, a liquid tight chamber 105 is defined by the cooperation of the lower mirror plate 101 and the depression in the base plate 100, with the seal member 106 around its edge.

Figure 2:
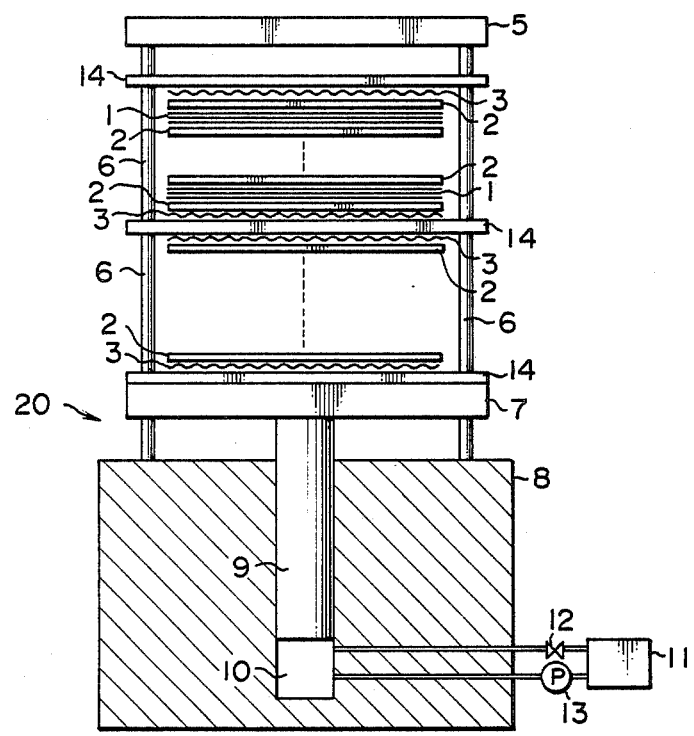
FIG. 2, which also relates to the prior art, is a side view partly in section of a multi opening machine for lamination charged with a number of such stacks as the stack shown in FIG. 1.

The press of FIG. 8 is charged with the stacked laminate materials in the same manner as was the prior art press of FIG. 2, with each stacked laminate material being laid on each supporting and pressing assembly 130 supported by the stops along the slide guide members 119, 119 as loosely spaced therealong and only restricted against downward movement. Next, the piston 129 is raised, so as to force the upper and lower end plates 117 and 118 together with a certain fairly low pressure, which should be preferably between zero and 10 kg/cm$^2$. This pressing together of the upper and lower end plates 117 and 118 is in fact only to remove the free play in the stacks 102 of material to be laminated, thus taking up the slack in the press. Such a process of driving the upper and the lower end plates to each other to remove the free play in the stacks 102, in an alternative construction, might be performed by other means such as cams or springs, instead of a cylinder-piston structure as in the shown embodiment.

And next, when the actual lamination process is to be performed, first the piston 129 or the lower end plate 118 is locked in place, as by closure of valves in the hydraulic fluid conduits leading to its pressure chamber, or by any proper locking means, and then, for each of the supporting and pressing assemblies 130, a pressure fluid is injected under a considerable pressure through the supply port 103, so as to fill the chamber 105 and so as to exert considerable pressure in the vertical direction in the figure over the part of the surface of the lower mirror plate 101 which defines said chamber 105, thus compressing the stack 102 of material to be laminated by an appropriate amount in an even and definite manner, due to the inherent flexibility of said mirror plate 101. (The base plate 100 is not substantially flexible). Because the pressure fluid is liquid, it is positively ensured that the pressure exerted thereby on the stack 102 of material to be laminated is uniform over the entire part of said stack exposed thereto, through the mirror plate 101. And then the heating element incorporated, in this particular construction, in the base plate 100 is activated, so as to apply heat to the stack 102 of material to be laminated; because no intermediate cushion plate is used as was the case in the above outlined prior art, this heat is quickly and evenly transmitted to the stack 102, with the evenness of said heat application again being ensured by the fluidity of the pressure fluid. This state of compression and heating is maintained for an appropriate time for lamination of the stack 102, and then the pressure fluid is drained from the chambers 105 of all of the supporting and pressing assemblies 130, and the press of FIG. 8 is opened and the finished laminate products are removed therefrom.

As suitable fluid for being used as the pressure fluid, there may be employed, for example, mineral oil, water, magnetic fluid, heat resistant liquid synthetic resin, or liquid halogen hydrocarbons. Trademarks of preferred oils, which are hydrocarbon family lubricants having good thermal stability at high temperatures, no corrosive effect on metals, and very good thermal transmission, are for example Neo SKoil No. 170, No. 240, and No. L-400 (Soken Chemical trademarks). The materials to be laminated may be a varnish of phenol resin, epoxy resin, polyester resin, polyimide resin, silicone resin or the like impregnated into a base material of paper or glass cloth or the like and then dried to form the so called prepreg sheet, SMC, metal plate, sheet form intrinsic material, green sheet, laminated IC board, or the like. This laminated IC board has a structure such as including one or both surfaces of an insulation base plate being laid with a circuit plate or plates carrying circuit patterns with interposition of a prepreg sheet therebetween, the resulting laminate assembly further being laminated with a one or two sided circuit plate, a one side copper plated laminate plate, and a copper film.

The temperature for heating the stacks of material to be laminated may be preferably, in the case of phenol resin or epoxy resin, 150° C. to 200° C., and may be preferably, in the case of polyimide resion, 180° C. to 250° C. And the pressure with which the pressure fluid is injected into the chambers 105 for compressing the stacks 102 of material to be laminated may be: in the case of phenol resin, 40 to 150 kg/cm$^2$, and preferably 60 to 100 kg/cm$^2$; in the case of epoxy resin, 5 to 100 kg/cm$^2$, and preferably 20 to 80 kg/cm$^2$; in the case of polyester resin, 5 to 100 kg/cm$^2$; and in the case of polyimide resin, 10 to 100 kg/cm$^2$. Depending on the type of material to be laminated, the pressure employed can be some hundreds of kilograms per square centimeter. It will be understood that, since the free play in the stacks of material to be laminated is initially removed by raising the lower end plate 118 as explained above, only a small quantity of pressure fluid is required to be injected into the chambers 105, and hence the compression of the stacks of material to be laminated can be carried out easily and conveniently. And because the pressure is applied via a fluid medium, the pressure can be changed quickly, and can be controlled in an easy way. In fact, as a refinement of the process of the present invention, because of the ease of thus varying the laminating pressure applied, it is possible to apply heat and pressure to the stacks of material to be laminated for a certain time period, for example 10 seconds to 60 minutes or so, then to release the pressure on the pressure fluid so as to depressurize the stacks, and then to reapply pressure to the pressure fluid again, in a cycle of application and release of pressure, so as to compression form the laminate material by repeated pressurizing and depressurizing thereof.

Thus, one of the advantages of the present invention is that the pressure and the temperature are more uniformly applied over the surface of the stack 102 of material to be laminated, thus producing a more uniform product, with no unevennesses due to uneven pressure and temperature application. Another very important advantage of the present invention is that, although many such stacks 102 of material to be laminated are all charged into the FIG. 8 press at the same time on top of one another, no problem exists with respect to sticking of the sliding of the base plates 100 on the slide guide members 119, 119, because the compression pressure on the stacks 102 is made available without any sliding movement of the base plates 100 on the slide guide members 119, 119, by each of the chambers 105 being pressurized to substantially the same pressure and expanding independently, rather than said compression effect being provided only from the bottom of the press as was the case with the prior art press shown in FIG. 2. This is a very important advantage in the case that many stacks 102 of material to be laminated are processed at one time; typically, up to some hundreds of layers may with advantage be charged into the press at one time, if the device and the method, according to the present invention are used.

Figure 1:
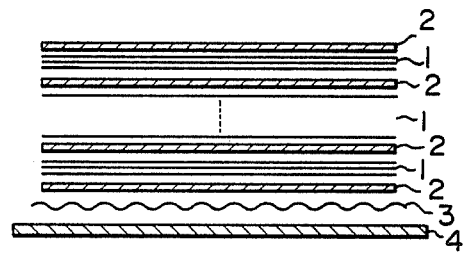
FIG. 1 relates to the prior art, and is a schematic sectional view through a stack consisting of a number of prepregs and mirror plates, which is being supported on a carrier plate with a cushion plate interposed therebetween.
Figure 4:
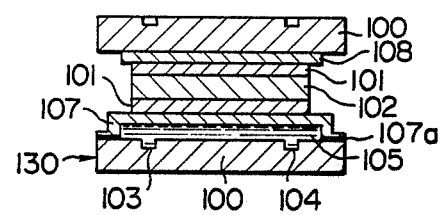
FIG. 4 is a sectional view, similar to FIG. 3, showing a second preferred embodiment of said aspect of the present invention.

In FIG. 4, there is shown a second possible construction for the supporting and pressing assemblies 130, according to another preferred embodiment of the present invention. In this construction, no depression is made in the base plate 100; instead, a carrier plate 107, which corresponds to the carrier plate 4 in FIG. 1 and carries the stacks 102 and the mirror plates 101 to charge them into the press 120, and which is formed as a shallow dish (upside down and opening downwards), is left on the base plate 100 so as to define a chamber 105 for the pressure fluid in cooperation with the upper surface of the base plate 100. In this embodiment the top plate 107 is provisionally assembled to the base plate 100, with a packing layer 107a being interposed therebetween, so that no leakage of pressure fluid can ever occur and less mess is caused. A plate element designated by 108 is provided to balance the intensities of the heating effects applied from the opposite sides of the stacks 102 by the upper and lower hot plate type base plates 100. This construction is used in the press of FIG. 8 in substantially the same way as was the construction of FIG. 3 as described above.

Figure 5:
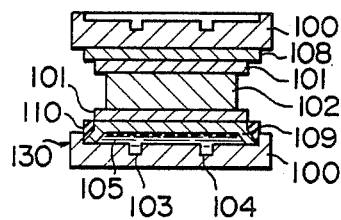
FIG. 5 is a sectional view, similar to FIGS. 3 and 4, showing a third preferred embodiment of said aspect of the present invention.

In FIG. 5, there is shown a third possible construction for the supporting and pressing plate assemblies 130, of the same type as the one shown in FIG. 4, according to another preferred embodiment of the present invention. In this construction, a depression is made in the base plate 100, in order more stably to hold the carrier plate 109 to be provisionally mounted upon the base plate 100. In this embodiment, the annular flange portion of the carrier plate 109 is so inclined as to increase stability of its mounting. In this connection, although it is not so shown in the figures, it is considered desirable that the fluid inlet 103 and the fluid outlet 104 are also inclined relative to the bottom surface of the depression, and do not open perpendicularly thereinto; this is in order for the pressure fluid, when supplied or exhausted via these apertures, to be better distributed around the chamber 105, in view of the extreme thinness of the chamber 105. In this embodiment, a flexible membrane member 109 is fixed with its periphery sealed to the edges of the depression in the plate 100 by a seal member 110, so as thereby to define a chamber 105 for the pressure fluid in cooperation with the upper surface of the base plate 100. A suitable material for the flexible membrane member 109 is fluorine rubber commonly sold under any of for example the following trademarks: Baiton (Showa Neoprene trademark), Fluoreel (Sumitomo 3M trademark), Daier (Daikin trademark), or Aflass (Asahi Glass trademark). If it is deemed necessary to do so, a thin metal membrane may be provided on the upper and/or the lower surface of the membrane member 109, made of for example aluminum or copper or the like; or a composite construction with a layer of glass cloth, Teflon glass cloth, or the like may be used, in order to provide a longer service life. Alternatively, a metal foil membrane alone may be used. As an alternative construction, in fact the depression in the base plate 100 is not strictly necessary, if a flexible membrane like the membrane 109 is used, although such a depression is considered to be desirable. This construction is again used in the press of FIG. 8 in substantially the same way as were the constructions of FIGS. 3 and 4 as described above.

Figure 6:
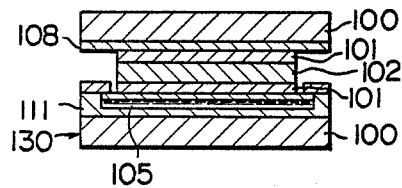
FIG. 6 is a sectional view, similar to FIGS. 3, 4, and 5, showing a forth preferred embodiment of said aspect of the present invention.

In FIG. 6, there is shown a fourth possible construction for the supporting and pressing assemblies 130, also of the same type as those shown in FIG. 4 and 5, according to another preferred embodiment of the present invention. In this construction, the plate element 111 is also a carrier plate which carries the stacks 102 and the mirror plates 101 to charge them into the press 120.

Figure 7:
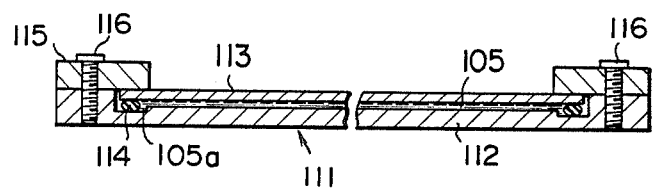
FIG. 7 is an enlarged sectional view of a part of the sectional view shown in FIG. 6, showing the carrier plate alone in more detail.

FIG. 7 shows the carrier plate 111 in more detail in a somewhat enlarged scale. In this case, a plate 113 is clamped down against a carrier plate 112 by a retainer member 115, which in fact is annular and extends all around the plates 112 and 113 although this cannot be seen in the figure, said retainer member 115 being held to the plate 112 by a plurality of retainer fixing means 116. A seal member 114 sits in a groove 105a formed around the upper surface of the plate 112, and seals between said plate 112 and the plate 113 to define a pressure chamber 105 therebetween.

Further, in this embodiment, there are provided neither supply port nor drain port such as the ports 103 and 104 in the preceding embodiments, but the device is so designed that a high fluid tightness is ensured by the seal member 114, the retainer member 115, and the retainer fixing means 116. By the high fluid tightness which is thus ensured, when the carrier plate 111 is heated by the heating means incorporated in the supporting and pressing plate assemblies 130, which, in this case, may be simple plate members, in the heating and pressing process the fluid sealed in the pressure chamber 105 expands and can apply a pressure high enough to accomplish the required pressure lamination process.

In some of the shown preferred embodiments, the area of the chamber 105 extends beyond the periphery of the material to be laminated. However, this is not strictly essential: the periphery of the material to be laminated may extend over the edge of the chamber 105, in its sideways extent, to an amount of not more than about 5 cm, and preferably to an amount of from about 2 cm to about 3 cm.

PRACTICAL EXAMPLE

A paper base material was impregnated with phenol resin, and was dried to form eight prepreg plates of length 2090 mm and width 1045 mm; these were sandwiched between two mirror plates and were mounted on a base incorporating heating means of length 2400 mm and width 1400 mm. On top of each of the base plates was formed a concave depression of length 2086 mm, width 1041 mm, and depth 2 mm, and the concave depression was covered with a fluorine rubber sheet of thickness 1 mm, secured at the periphery with a gasket. Sixteen such structures were arranged in a pile, a hot plate in which a concave depression was not formed was placed on top, and the whole pile was charged in a press similar to the press of FIG. 8. Heat resistant mineral oil was supplied to the concave depressions of the base plates, and was pressurized to a pressure of 90 kg/cm$^2$, while the base plates were heated to a temperature of 170° C.; thus the multiple stacks of prepreg plates were heated and pressurized for 60 seconds. Then the pressure on the heat resistant oil in the concave depressions of the base plates was relieved for 30 seconds, and then the heat resistant oil was pressurized to 90 kg/cm$^2$ again, and this time the stacks of prepreg plates were pressurized and heated at 170° C. for 30 minutes, and then were cooled for 5 minutes. The laminate material obtained was of good superficial quality and the accuracy and uniformity of the thickness thereof was extremely good.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A plate assembly for applying high pressing force uniformly over a plate material such as a stack of sheet material to be pressed together to become a laminate plate material, comprising a base plate member formed with a shallow chamber space at a central portion thereof while an annular peripheral portion thereof being left to provide an annular land portion surrounding said shallow chamber space, an annular seal member placed in said shallow chamber space so as to extend along and adjacent said annular land portion, a cover plate member mounted in said shallow chamber space with an annular peripheral portion thereof being placed to extend along and adjacent an inner peripheral portion of said annular land portion in continuous sealing engagement with said annular seal member, thereby confining a thin pressure chamber in said shallow chamber space as peripherally blocked by said annular seal member, an annular retainer member having an annular outside half portion engaged with said land portion of said base plate member and an annular inside half portion engaged with an annular peripheral portion of said cover plate member, and means for fastening said annular retainer member to said annular land portion of said base plate member, said thin pressure chamber being adapted to be filled with oil.

2. A plate assembly according to claim 1, wherein said base plate member is formed with an annular groove which makes said shallow chamber space to be deeper at an annular peripheral portion thereof along and adjacent said land portion thereof so as to receive said annular seal member therein.

3. An arrangement for manufacturing a laminated material by pressing a stack of sheet material together at higher pressure by employing a plate assembly according to claim 1, comprising a plurality of said plate assemblies, means for selectively increasing the pressure of the oil in said thin pressure chambers of said plate assemblies, a press having two end plates adapted to be selectively moved toward or away from one another, and at least one intermediate plate member disposed between said two end plates of said press so as to be freely movable toward or away from said end plates, whereby a plurality of said stacks of sheet material is sandwiched between on of said two end plates and one of said intermediate plate members, then said two end plates of said press are approached toward one another to tighten all stacked up assemblage held therebetween, and then the pressure of the oil in said thin pressure chambers of said plate assemblies is increased thereby to apply pressing force to each of said stacks of sheet material with said two end plates of said press being held unmoved.

* * * * *